US009789871B1

(12) United States Patent
Dlala et al.

(10) Patent No.: US 9,789,871 B1
(45) Date of Patent: Oct. 17, 2017

(54) HIGH EFFICIENCY, HIGH POWER DENSITY DRIVE SYSTEM UTILIZING COMPLEMENTARY MOTOR ASSEMBLIES

(71) Applicant: Atieva, Inc., Menlo Park, CA (US)

(72) Inventors: Emad Dlala, Pleasanton, CA (US); Roberto Melendez, Menlo Park, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 15/229,498

(22) Filed: Aug. 5, 2016

(51) Int. Cl.
| B60W 30/02 | (2012.01) |
| B60W 10/14 | (2012.01) |
| B60W 10/08 | (2006.01) |
| B60L 11/02 | (2006.01) |
| B60L 11/18 | (2006.01) |
| H02P 5/747 | (2006.01) |

(52) U.S. Cl.
CPC .............. *B60W 30/02* (2013.01); *B60L 11/02* (2013.01); *B60L 11/18* (2013.01); *B60W 10/08* (2013.01); *B60W 10/14* (2013.01); *H02P 5/747* (2013.01); *B60L 2220/12* (2013.01); *B60L 2220/14* (2013.01); *B60W 2510/083* (2013.01); *B60W 2520/28* (2013.01); *B60W 2710/12* (2013.01); *B60W 2720/403* (2013.01)

(58) Field of Classification Search
CPC ...... B60W 10/08; B60W 11/02; B60W 11/18; B60W 10/14; B60W 2220/14; B60W 2720/403; B60W 2520/28; B60W 2510/083; B60W 2220/12; B60W 2710/12

See application file for complete search history.

(56) References Cited

U.S. PATENT DOCUMENTS

| 8,761,985 B2 | 6/2014 | Tang | |
| 2006/0180365 A1* | 8/2006 | Innami | B60K 7/0007 180/65.51 |
| 2010/0194318 A1 | 8/2010 | Aso | |
| 2011/0012544 A1* | 1/2011 | Schulz | B60L 15/025 318/400.02 |
| 2014/0045648 A1* | 2/2014 | Bangura | F02N 11/006 477/3 |
| 2015/0236575 A1* | 8/2015 | Walsh | H02K 21/46 310/156.07 |

* cited by examiner

*Primary Examiner* — Rodney Butler
(74) *Attorney, Agent, or Firm* — Patent Law Offices of David G. Beck

(57) ABSTRACT

A dual-motor electric vehicle (EV) drive system is provided that employs two different types of electric motors; at least one permanent magnet synchronous motor and at least one induction asynchronous motor. Under most low demand driving applications the EV relies on the permanent magnet motor(s), thus benefiting from the operating efficiency of this type of motor. Under high demand driving applications, for example during strong acceleration and high speed cruising, the EV is able to benefit from the output power capabilities of the induction motor(s).

15 Claims, 9 Drawing Sheets

HIGH EFFICIENCY, HIGH POWER DENSITY DRIVE SYSTEM UTILIZING COMPLEMENTARY MOTOR ASSEMBLIES

FIELD OF THE INVENTION

The present invention relates generally to electric motors and, more particularly, to an electric vehicle powertrain utilizing complementary motors.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

The most common approach to achieving a low emission, high efficiency car is through the use of a hybrid drive train in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at a reduced level compared to a conventional vehicle. Additionally, due to the inclusion of both an internal combustion engine and an electric motor(s) with its accompanying battery pack, the drive train of a hybrid vehicle is typically more complex than that of either a conventional ICE-based vehicle or an all-electric vehicle, resulting in increased cost and weight. Accordingly, several vehicle manufacturers are designing vehicles that only utilize an electric motor, thereby eliminating one source of pollution while significantly reducing drive train complexity.

While vehicle manufacturers may achieve the benefits of an all-electric vehicle using a single electric motor, the efficiency and traction control offered my multi-motor configurations has led to the development of alternative drive train control systems. For example, U.S. Patent Publication No. 2010/0194318 discloses an electric vehicle that includes multiple drive motors, multiple power supplies, multiple inverters and a single DC-DC power converter. A control circuit coupled to both the power supplies and the inverters provides instructions to each, thus allowing the system to efficiently utilize the multiple motors while taking advantage of the output characteristics of each power supply. In an alternate configuration disclosed in U.S. Pat. No. 8,761,985, a pair of motors with a shared transmission provides a means of optimizing the torque applied by each of the motors. A method of optimizing the torque is described that takes into account wheel slip.

While a variety of hybrid and all-electric vehicles are known, an improved multi-motor configuration is needed with improved power output and efficiency. The present invention provides such an improved drive system.

SUMMARY OF THE INVENTION

The present invention provides a drive assembly for an electric vehicle that includes both synchronous and asynchronous electric motors. In particular, the drive assembly of the invention is comprised of (i) at least one permanent magnet synchronous motor mechanically coupled to, and configured to provide propulsive power to, at least one wheel of a first vehicle axle (e.g., the front vehicle axle); (ii) a first motor controller coupled to the at least one permanent magnet synchronous motor; (iii) at least one induction asynchronous motor mechanically coupled to, and configured to provide propulsive power to, at least one wheel of a second vehicle axle (e.g., the rear vehicle axle); and (iv) a second motor controller coupled to the at least one induction asynchronous motor. The drive assembly further includes a vehicle controller that is electrically connected to the first motor controller and to the second motor controller. A memory containing both a set of permanent magnet motor characteristics and a set of induction motor characteristics is accessible by the vehicle controller. The vehicle controller is configured to receive a current torque request (for example input by the driver using the accelerator pedal) and determine and apply an optimal power split between propulsive power supplied by the at least one permanent magnet synchronous motor and propulsive power supplied by the at least one induction asynchronous motor, where the optimal power split is based on the current torque request, the permanent magnet motor characteristics and the induction motor characteristics, and where the vehicle controller is configured to continually update the optimal split based on the current torque request, the set of permanent magnet motor characteristics and the set of induction motor characteristics. Preferably the at least one permanent magnet synchronous motor is coupled to the at least one wheel of the first axle via a first differential (e.g., a locking differential) and the at least one induction asynchronous motor is coupled to the at least one wheel of the second axle via a second differential (e.g., a locking differential). The vehicle controller, first motor controller and second motor controller may be combined into a single master controller.

The drive assembly may further include at least one wheel speed sensor, where the vehicle controller is configured to receive a current wheel speed from the at least one wheel speed sensor, and where the vehicle controller is configured to continually update the optimal power split based on the current torque request, the current wheel speed, the set of permanent magnet motor characteristics and the set of induction motor characteristics.

The drive assembly may further include a motor speed sensor coupled to the at least one permanent magnet synchronous motor, where the vehicle controller is configured to receive a current motor speed corresponding to the at least one permanent magnet synchronous motor from the motor speed sensor, and where the vehicle controller is configured to continually update the optimal power split based on the current torque request, the current motor speed, the set of permanent magnet motor characteristics and the set of induction motor characteristics.

The drive assembly may further include a motor speed sensor coupled to the at least one induction asynchronous motor, where the vehicle controller is configured to receive a current motor speed corresponding to the at least one induction asynchronous motor from the motor speed sensor, and where the vehicle controller is configured to continually update the optimal power split based on the current torque request, the current motor speed, the set of permanent magnet motor characteristics and the set of induction motor characteristics.

The drive assembly may further include a (i) battery pack configured to supply electrical energy to the at least one permanent magnet synchronous motor and to the at least one induction asynchronous motor, and (ii) an inverter electrically interposed between the battery pack and the at least one permanent magnet synchronous motor and electrically interposed between the battery pack and the at least one induction asynchronous motor, where the inverter supplies electrical energy from the battery pack to the at least one permanent magnet synchronous motor and supplies electrical energy from the battery pack to the at least one induction asynchronous motor. The inverter may be comprised of a first inverter electrically interposed between the battery pack and the at least one permanent magnet synchronous motor and a second inverter electrically interposed between the battery pack and the at least one induction asynchronous motor. Additionally, the battery pack may be comprised of a first battery pack electrically connected to the at least one permanent magnet synchronous motor via the first inverter and a second battery pack electrically connected to the at least one induction asynchronous motor via the second inverter.

The at least one permanent magnet synchronous motor may be comprised of a single permanent magnet synchronous motor mechanically coupled to the at least one wheel of the first vehicle axle and the at least one induction asynchronous motor may be comprised of a single induction asynchronous motor mechanically coupled to the at least one wheel of the second vehicle axle; alternately, the at least one permanent magnet synchronous motor may be comprised of a single permanent magnet synchronous motor mechanically coupled to the at least one wheel of the first vehicle axle and the at least one induction asynchronous motor may be comprised of a first induction asynchronous motor mechanically coupled to the at least one wheel of the second vehicle axle and a second induction asynchronous motor mechanically coupled to the at least one wheel of the second vehicle axle; alternately, the at least one induction asynchronous motor may be comprised of a single induction asynchronous motor mechanically coupled to the at least one wheel of the second vehicle axle and the at least one permanent magnet synchronous motor may be comprised of a first permanent magnet synchronous motor mechanically coupled to the at least one wheel of the first vehicle axle and a second permanent magnet synchronous motor mechanically coupled to the at least one wheel of the first vehicle axle.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, similarly, a first step could be termed a second step, similarly, a first component could be termed a second component, all without departing from the scope of this disclosure.

Figure 1:
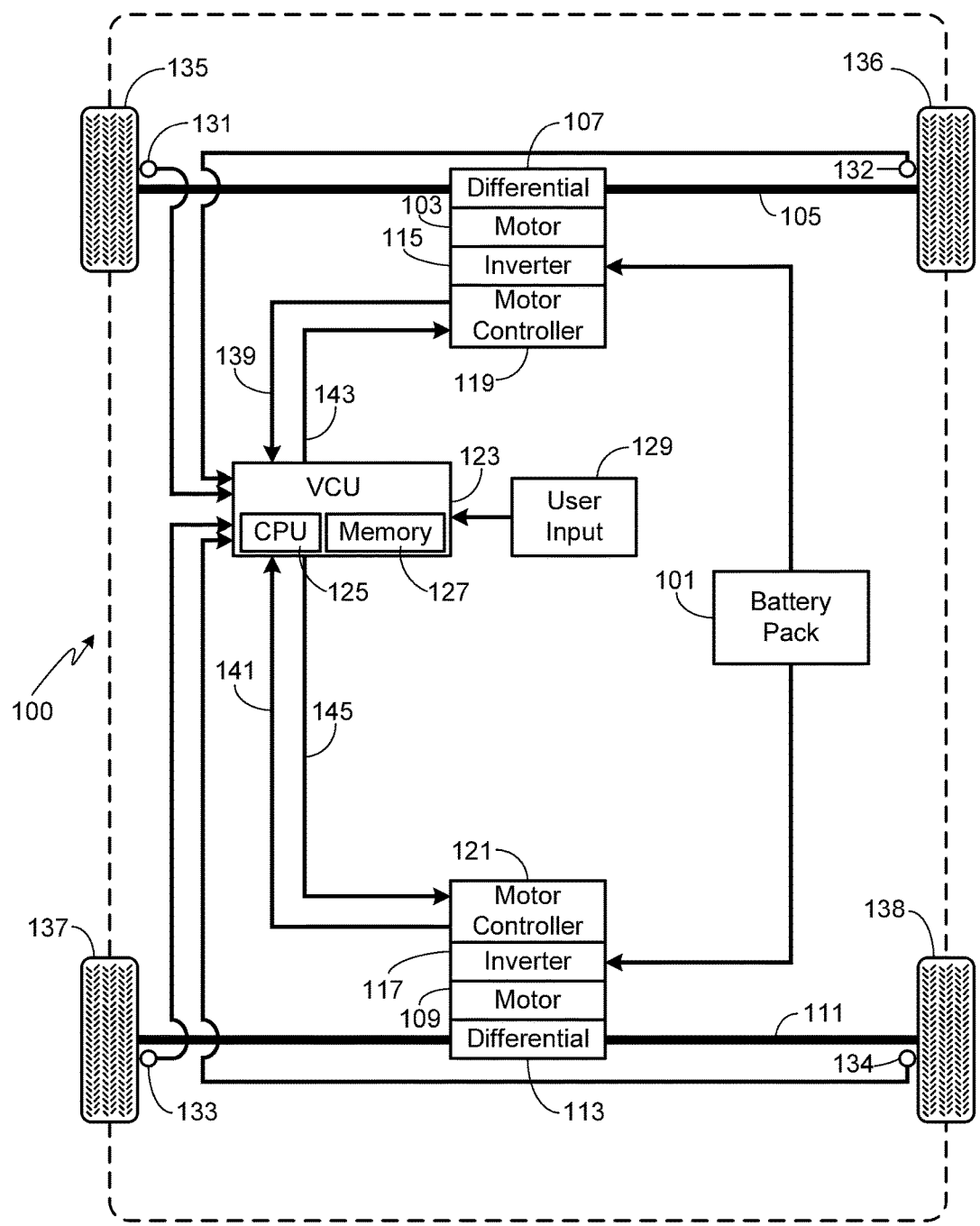
FIG. 1 illustrates a dual-motor drive system in accordance with the invention, the illustrated system utilizing a single power source.
Figure 2:
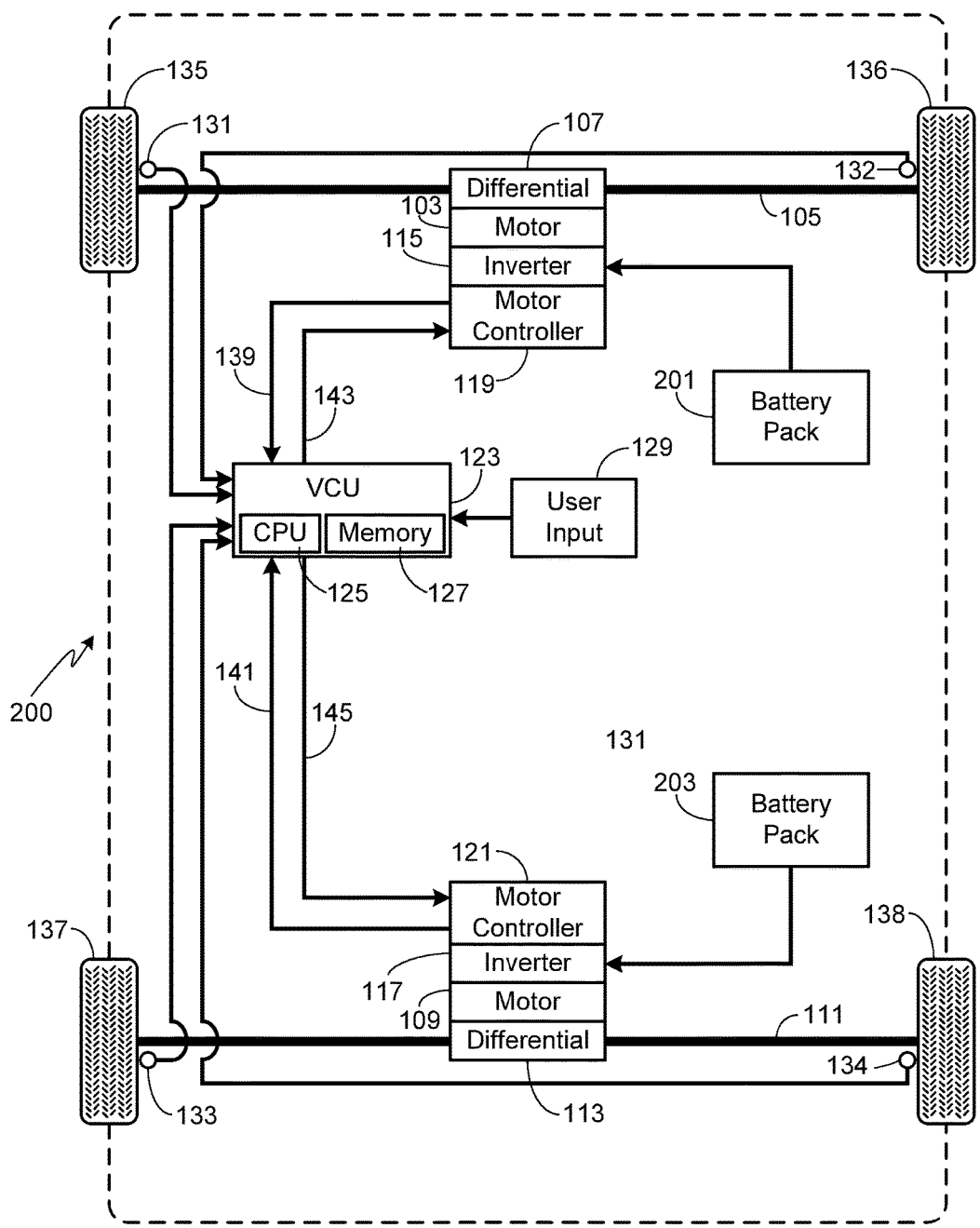
FIG. 2 illustrates a dual-motor drive system similar to that shown in FIG. 1, except that the illustrated system utilizes a pair of power sources.

FIGS. 1 and 2 illustrate exemplary dual-motor electric vehicle (EV) drive systems in accordance with the invention. The system shown in FIG. 1 utilizes a single power source, e.g., battery pack 101, while the system shown in FIG. 2 utilizes a pair of power sources, e.g., battery packs 201 and 202. In both implementations a first motor 103 is coupled to front axle 105 via a differential 107, while a second motor 109 is coupled to rear axle 111 via a differential 113. Preferably differentials 107 and 113 are locking differentials, i.e., differentials that may be locked using an integrated clutch or other means. It should be understood, however, that the use of locking differentials is not required by the invention. Each battery pack 101, 201 and 202 may be comprised of a single rechargeable battery; alternately, tens of rechargeable batteries; alternately, hundreds of rechargeable batteries; alternately, thousands of rechargeable batteries. Preferably the battery pack(s) not only supplies energy to the electric motors, but also supplies energy to the various vehicle systems that require electrical power (e.g., internal and external lighting, entertainment systems, navigation system, etc.).

In the configuration shown in FIG. 1, battery pack 101 is coupled to motor 103 via an inverter 115 and coupled to motor 109 via an inverter 117. In the configuration shown in FIG. 2, battery pack 201 is coupled to motor 103 via inverter 115 and battery pack 203 is coupled to motor 109 via inverter 117. Motor controller 119 insures that the energy delivered to drive motor 103 is of the proper form (e.g., correct voltage, current, frequency, etc.) while motor controller 121 insures that the energy delivered to drive motor 109 is of the proper form (e.g., correct voltage, current, frequency, etc.).

In order to achieve the benefits of the present invention, two different types of electric motors are used; a permanent magnet synchronous motor and an induction asynchronous motor. Permanent magnet synchronous motors exhibit high efficiency in low speed, low torque applications, such as that required in city driving, and therefore are often used in plug-in hybrid vehicles. This type of motor can become inefficient in a high power, high torque application. In contrast, induction motors are less efficient at low torque or power operating points but provide ample power for high speed, high torque applications, thus making them well suited for premium electric vehicles. Although not required, in the preferred embodiment of the invention the induction motor is used as rear motor 109, thus taking advantage of the high torque, high power density characteristics of this type of motor, especially given the transfer of vehicle weight towards the rear during forward vehicle travel. The lower torque, permanent magnet motor is preferably used in the front of the vehicle, i.e., as motor 103, thus maximizing the energy that is recovered and stored in the battery pack(s) during braking when vehicle weight is transferred forward.

The combination of a permanent magnet motor and an induction motor, preferably in the configuration noted above, provides a drive train that can be optimized both in terms of power and efficiency, thus yielding a flatter power curve at high motor speed while achieving overall improved operational efficiency. In particular, vehicle controller 123 is able to determine an optimal power split between motors 103 and 109 in real time based on the efficiency and power characteristics of each motor as well as the needs of the vehicle.

Vehicle controller 123, also referred to herein as a vehicle control unit or VCU, is comprised of a central processing unit (CPU) 125 and a memory 127. Preferably VCU 123 also serves as the vehicle's management system. Memory 127, which is used to store data such as the characteristics of motors 103 and 109 as well as power splitting instructions, may be comprised of EPROM, EEPROM, flash memory, RAM, a solid state disk drive, a hard disk drive, or any other memory type or combination of memory types. Depending upon the type(s) of display used in the vehicle as well as the capabilities of CPU 125, VCU 123 may also include a graphical processing unit (GPU). The CPU and GPU may be separate or contained on a single chip set.

In addition to having access to the characteristics of the two motors, e.g., permanent magnet motor 103 and induction motor 109, VCU 123 also receives driver input from at least one input device 129. In a typical configuration, input device 129 is the vehicle's accelerator pedal and the data supplied to VCU 123 is a torque request. In addition to providing VCU 123 with a torque request, preferably wheel speed and/or motor speed is also provided to controller 123. The wheel speed may be provided by a single sensor, for example sensor 131 on wheel 135, or using multiple sensors, e.g., sensors 131-134 on corresponding wheels 135-138. VCU 123 may acquire the current motor speed of motor 103 from motor controller 119, this data being provided to VCU 123 via the vehicle's Controller Area Network (CAN) bus over signal path 139. Similarly, motor controller 121 may provide the current motor speed of motor 109 to VCU 123 via CAN bus signal line 141. Based on the power and efficiency characteristics of motors 103 and 109, the speed of the car and/or the speed of one or both motors, and the needs of the driver, which may be communicated to controller 123 by the accelerator pedal, VCU 123 determines an appropriate power split between the two motors. VCU continually updates the control signals to motor controllers 119 and 121 via CAN bus signal lines 143 and 145, respectively.

Figure 3:
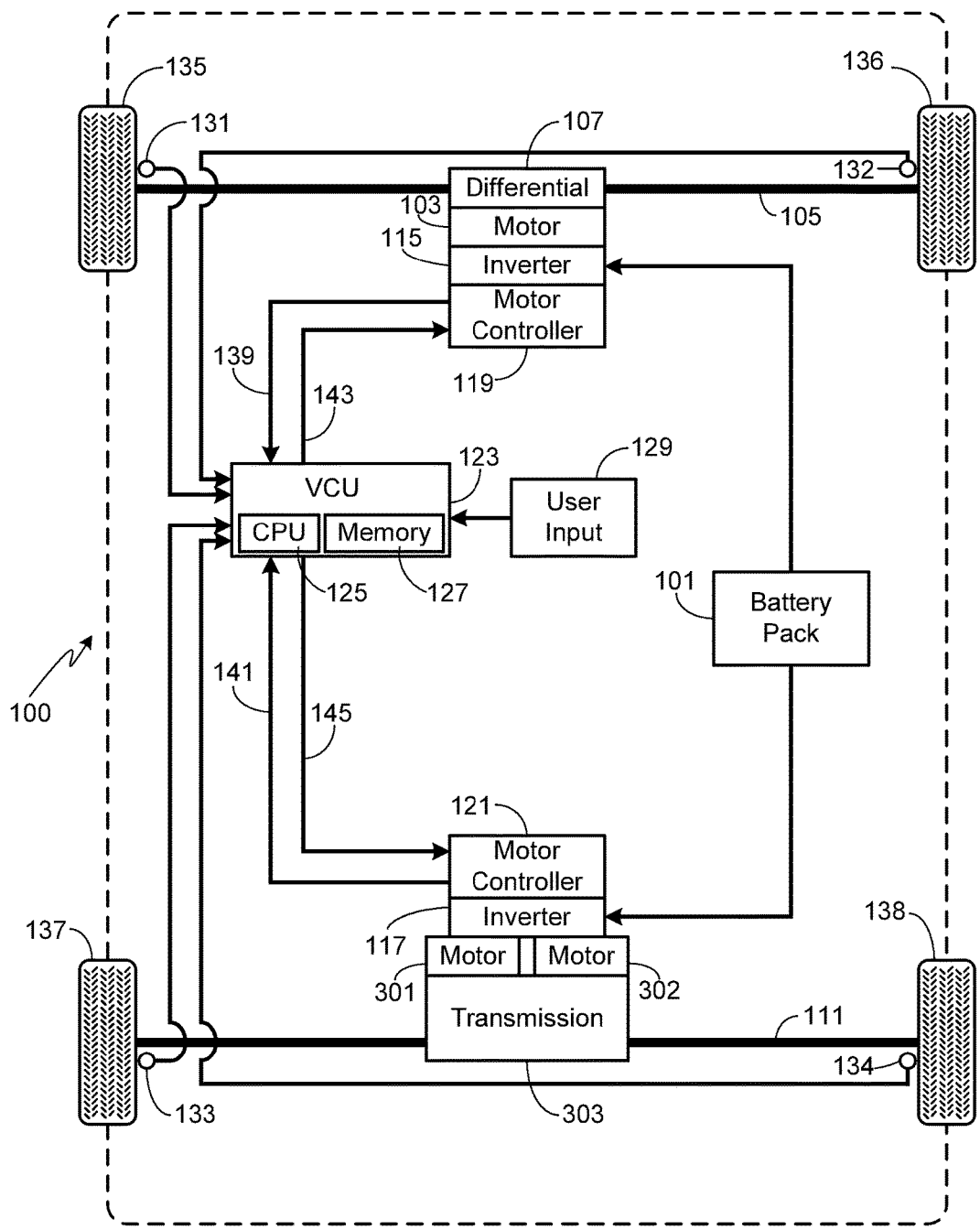
FIG. 3 illustrates a dual-motor drive system similar to that shown in FIG. 1, except that the illustrated system utilizes a pair of induction motors coupled to the rear axle.
Figure 4:
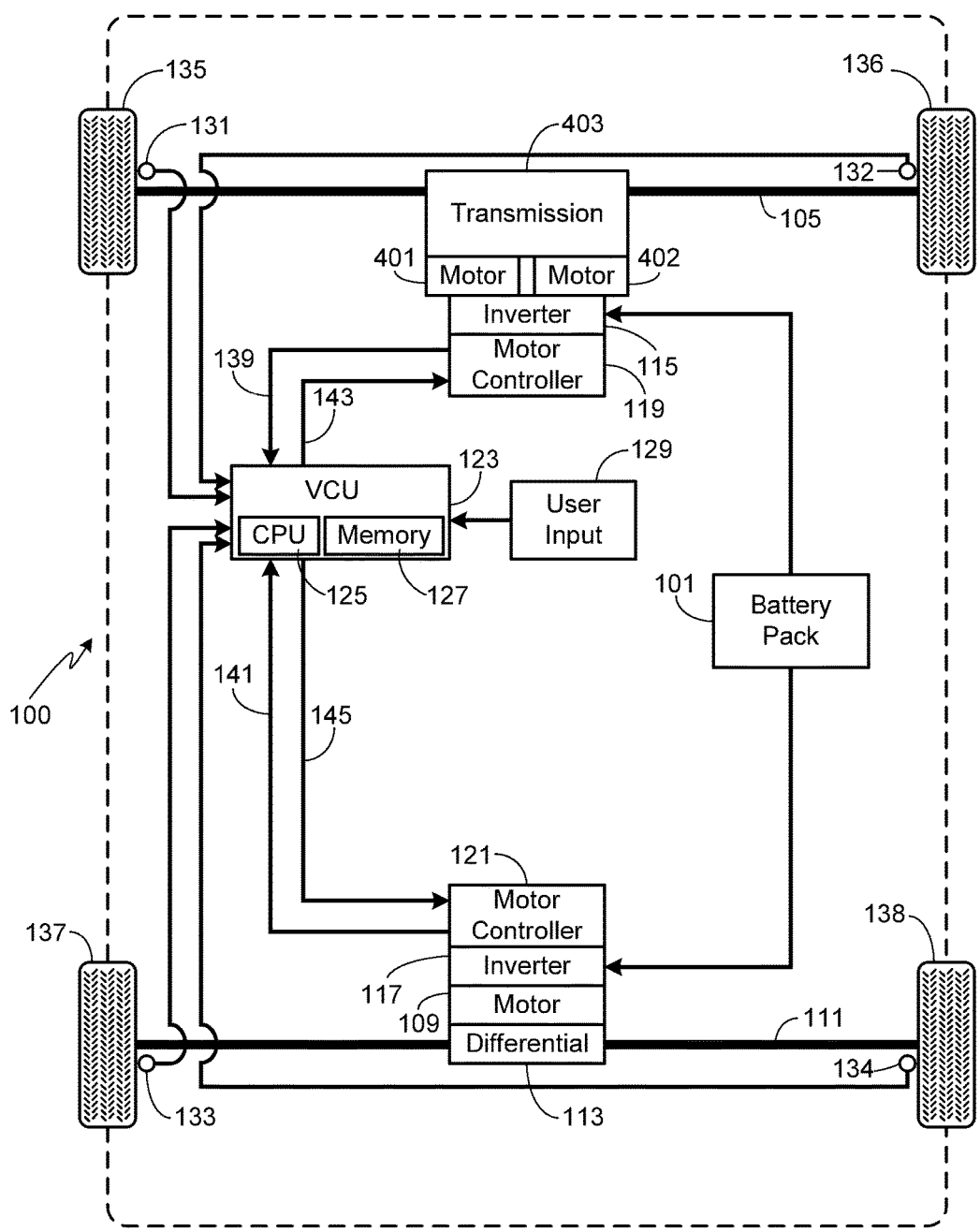
FIG. 4 illustrates a dual-motor drive system similar to that shown in FIG. 1, except that the illustrated system utilizes a pair of permanent magnet motors coupled to the front axle.

It should be understood that while each of the exemplary embodiments shown in FIGS. 1 and 2 include only two motors, the invention is equally applicable to other configurations that utilize more than two motors. For example, the configuration shown in FIG. 3 includes a pair of induction asynchronous motors 301/302 coupled via transmission 303 to rear axle 111, and a single permanent magnet synchronous motor 103 coupled to front axle 105. Alternately, in the configuration shown in FIG. 4 a pair of permanent magnet synchronous motors 401/402 are coupled via transmission 403 to front axle 105 while a single induction asynchronous motor 109 is coupled to rear axle 111. It will be appreciated that the inventors envision other configurations of permanent magnet synchronous motors and induction asynchronous motors. Additionally, while the configurations shown in FIGS. 3 and 4 utilize a single battery pack 101, these and/or other motor configurations may utilize more than one battery pack, as exemplified by the embodiment shown in FIG. 2.

The inventors performed a case study to verify the benefits of the dual motor configuration of the invention. The induction motor and the permanent magnet synchronous motor selected for the study were of the same size and optimized for the same traction motor application. During the pre-study optimization phase, electromagnetic, structural, and thermal design optimizations were performed. The same maximum RMS current and the same DC voltage limit were supplied to both motors.

Figure 5:
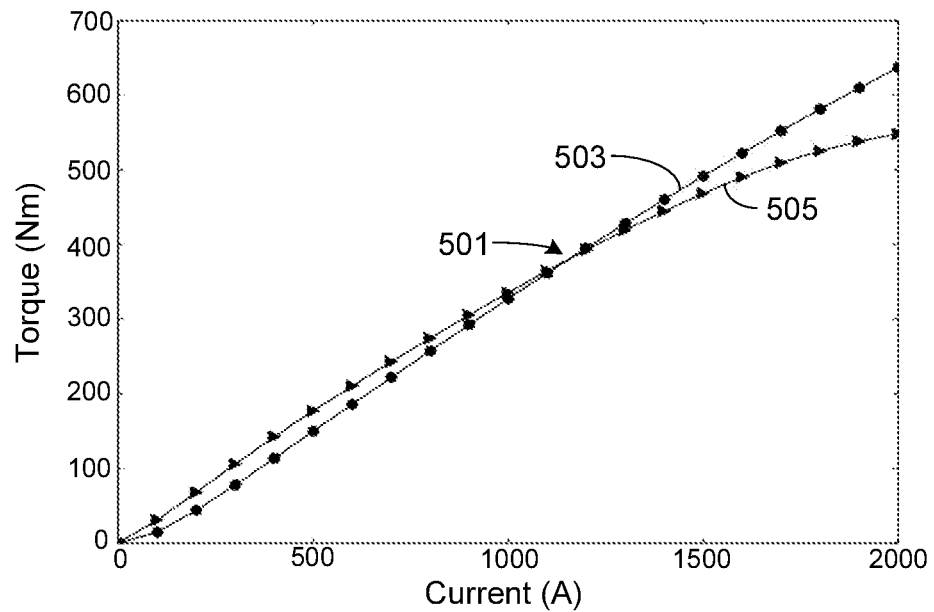
FIG. 5 illustrates the electromagnetic characteristics of the permanent magnet and induction motors used in a case study performed to verify the benefits of the dual motor configuration of the invention.

FIG. 5 illustrates the electromagnetic characteristics of the permanent magnet synchronous motor and the induction asynchronous motor used in the case study. For the purposes of this comparison, the two motors were run at a fixed speed of 4000 rpm while increasing the load torque from 0 to the peak torque. The operating conditions for each motor were optimized to maximize the efficiency and torque of the motors. In particular, the rotor flux of the induction motor and the direct and quadrature currents (Id and Iq) of the permanent magnet motor were optimized.

As shown in FIG. 5, until cross-over point 501 the induction motor (curve 503) produces less torque for a given stator current than the permanent magnet motor (curve 505). This result is due to the permanent magnet motor, which uses its permanent magnets to create magnetic flux in the air-gap, drawing less electrical current than the induction motor. After cross-over point 501, which occurs at approximately 1150 A for these motors, the induction motor keeps producing torque linearly with current. In contrast, the torque of the permanent magnet motor begins to decay after cross-over point 501 as a result of the high current and saturation causing a decrease in the magnetic flux produced by the magnets in this type of motor. Therefore while the permanent magnet motor is more efficient at low torque levels, the induction motor produces higher power and torque at high currents.

Based on the motor characteristics described above, the optimal strategy would be to operate the two motors in a complementary manner such that the permanent magnet motor was utilized until the cross-over point 501, after which the induction motor would be utilized. However since a motor must be designed to operate throughout the current range, i.e., 0 to the peak current, the preferred approach described herein is the combination of the two motors in a single EV. As noted above, given weight and force distribution dynamics, preferably the lower peak torque motor, i.e., the permanent magnet motor, is used for the front drive train motor 103 and the higher peak torque motor, i.e., the induction motor, is used for the rear drive train motor 109.

Figure 6:
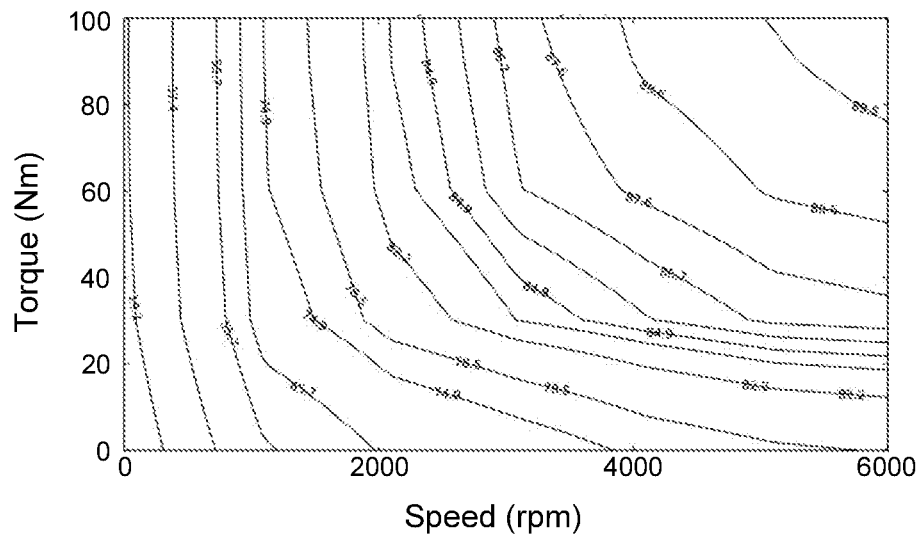
FIG. 6 provides an efficiency map for an induction motor over a range of torque values and a range of motor speeds.
Figure 7:
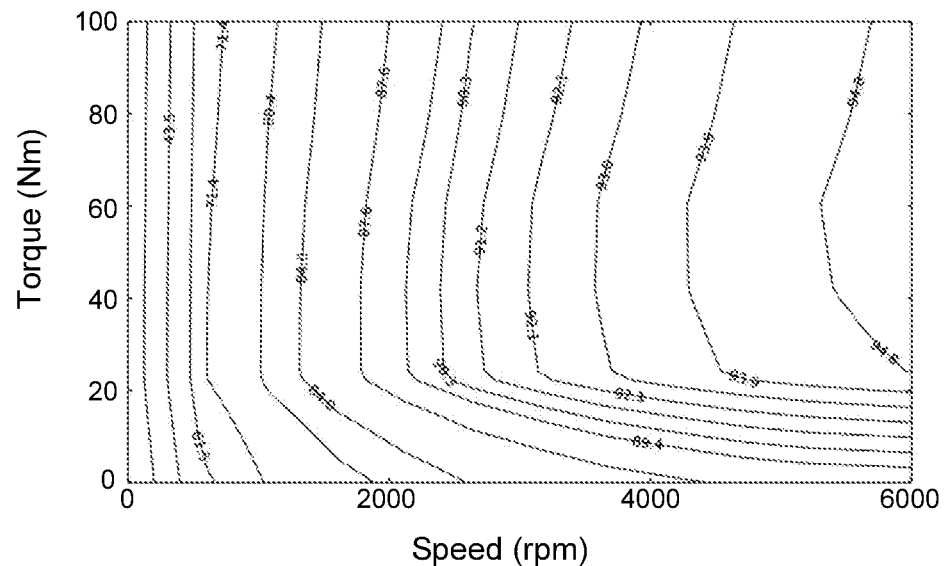
FIG. 7 provides an efficiency map for a permanent magnet motor over a range of torque values and a range of motor speeds.

FIGS. 6 and 7 provide efficiency maps for the induction motor and the permanent magnet motor, respectively, over a range of torque values and a range of motor speeds. As described above and illustrated in the figures, the permanent magnet motor provides superior efficiency in the low torque region.

Figure 8:
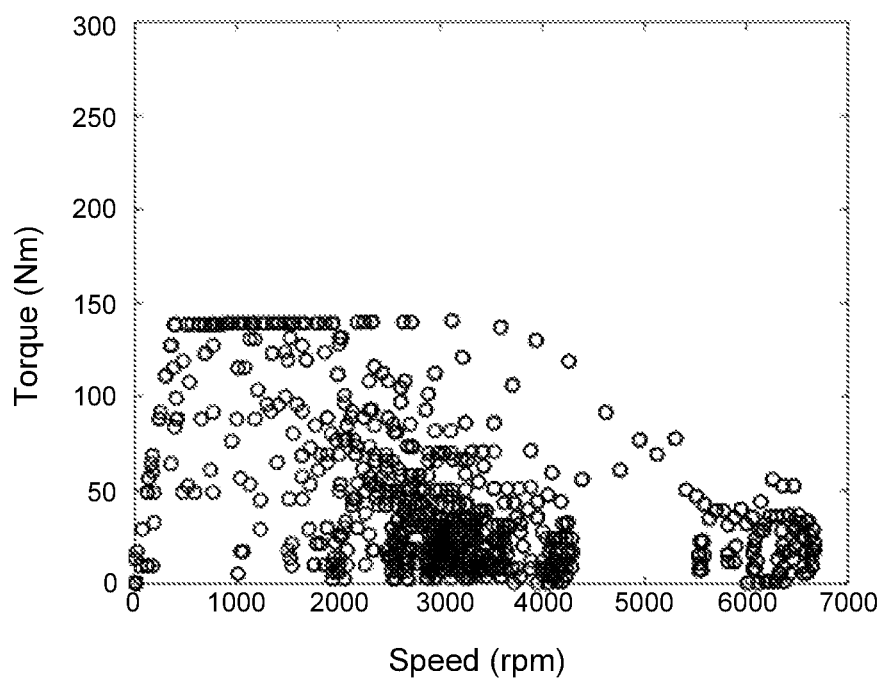
FIG. 8 provides a scatter chart showing the operating points of a motor during a federal test procedure city cycle.

FIG. 8 is a scatter chart that provides the operating points of a motor during a federal test procedure (FTP) city cycle. As FIG. 8 shows, most data points lie in the 0-100 Nm range and the 0-6000 rpm range. During the case study the inventors found that using a dual motor configuration with a permanent magnet synchronous motor and an induction asynchronous motor when operating the vehicle at low speed and at low torque saved approximately 300 Wh per FTP cycle, as compared to a configuration utilizing two induction motors. In a typical vehicle application, this value translates to approximately 25 to 30 extra miles of driving range per cycle.

Figure 9:
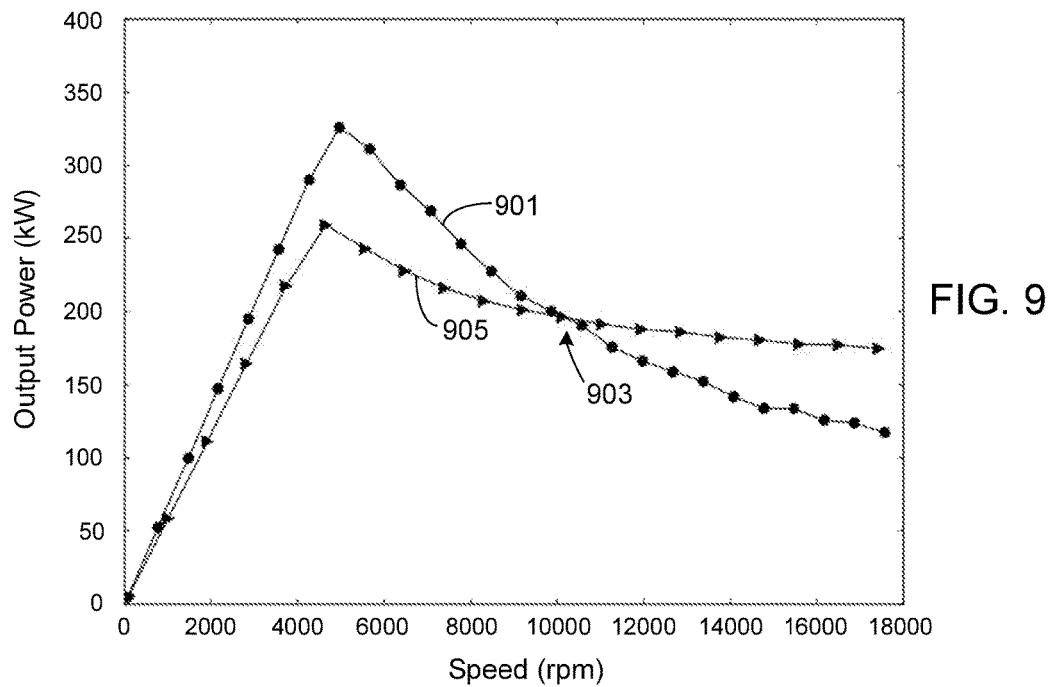
FIG. 9 illustrates the output power versus motor speed for the permanent magnet and induction motors used in a case study.
Figure 10:
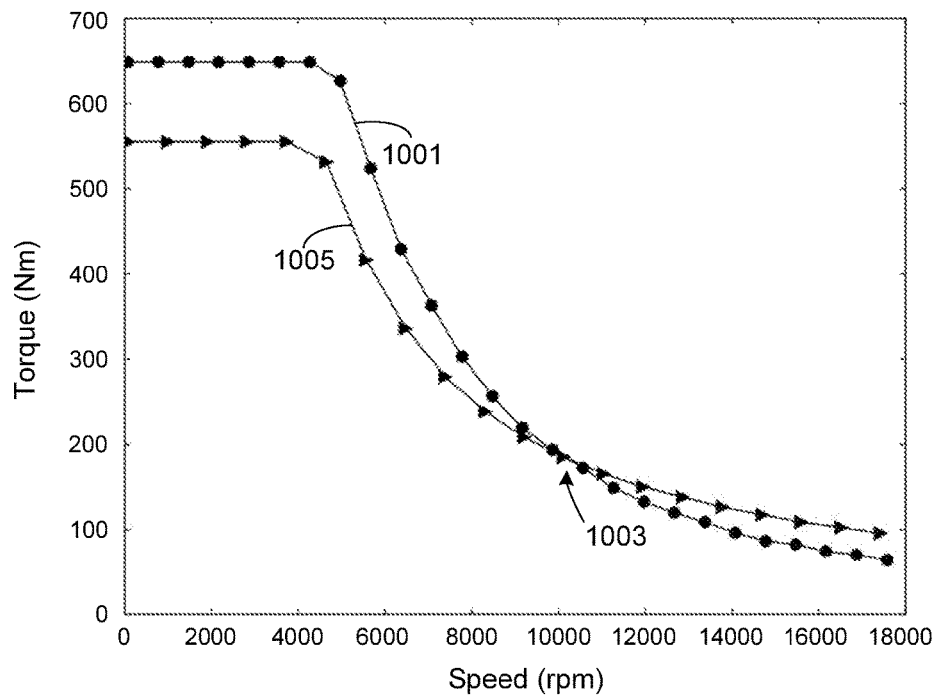
FIG. 10 illustrates the torque versus motor speed for the permanent magnet and induction motors used in a case study.

Another advantage of having two complementary motors becomes visible at the flux weakening region as illustrated in FIGS. 9 and 10. As shown in the case study, the induction motor (curves 901 and 1001) is superior in terms of peak torque and power throughout approximately the first two-thirds of the power/torque speed curves. Unfortunately in the final third of the power/torque speed curves, i.e., starting at cross-over point 903 in the power speed curves and cross-over point 1003 in the torque speed curves, the induction motor starts to suffer from higher rotor losses and high induced voltages, leading to a relatively rapid decrease in output power and torque. The interior permanent magnet motor, however, provides superior high speed performance (see curve 905 in FIG. 9 and curve 1005 in FIG. 10) due to its extensive use of reluctance torque. Therefore by combining these two different types of electric motors as described herein, the high performance of the induction motor is available under high demand scenarios at low and medium speeds, while the benefits of the permanent magnet motor are available at high speeds.

Figure 11:
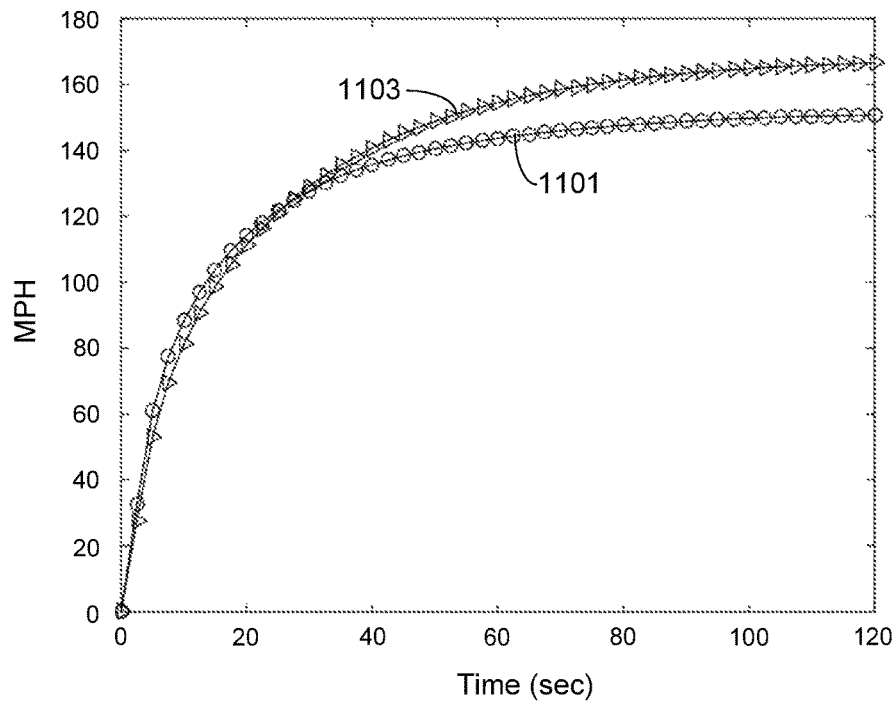
FIG. 11 illustrates the acceleration profile of a typical car based on the power and torque curves of FIGS. 9 and 10.

FIG. 11 provides acceleration profiles for a typical car based on the power and torque curves of FIGS. 9 and 10, respectively, where curve 1101 corresponds to the induction motor and curve 1103 corresponds to the permanent magnet motor. This figure reemphasizes the complementary behavior between the permanent magnet synchronous motor and the induction asynchronous motor. As shown, the induction motor allows the car to accelerate faster below 10,000 rpm, which is equivalent to approximately 80 MPH using an appropriate gear ratio, whereas the permanent magnet motor is superior in the higher speed region.

Figure 12:
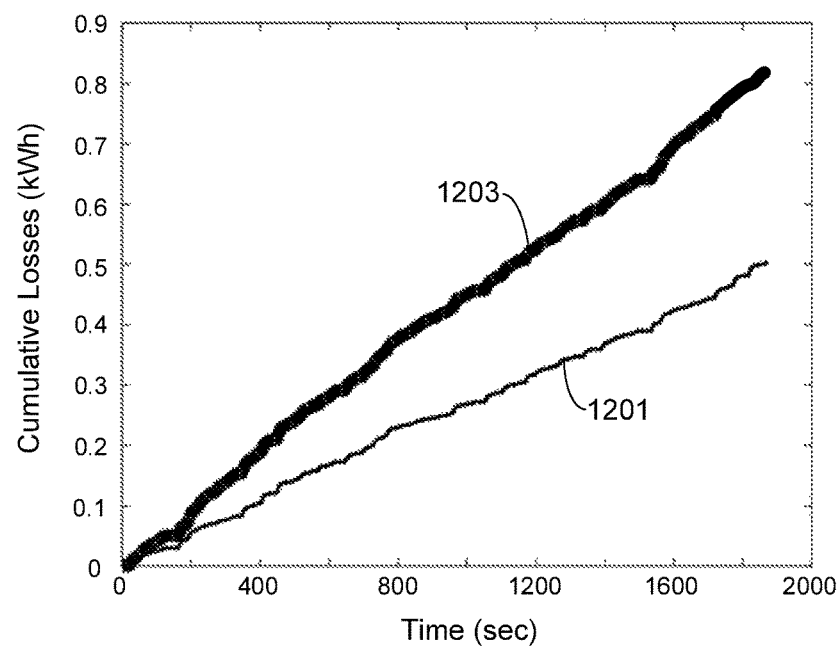
FIG. 12 compares the cumulative losses incurred during an FTP city cycle for the permanent magnet motor and the induction motor used in a case study.

FIG. 12 compares the cumulative losses incurred during an FTP city cycle for the permanent magnet motor (curve 1201) and the induction motor (curve 1203). Clearly the permanent motor exhibits lower losses due to heat loss.

Figure 13A:
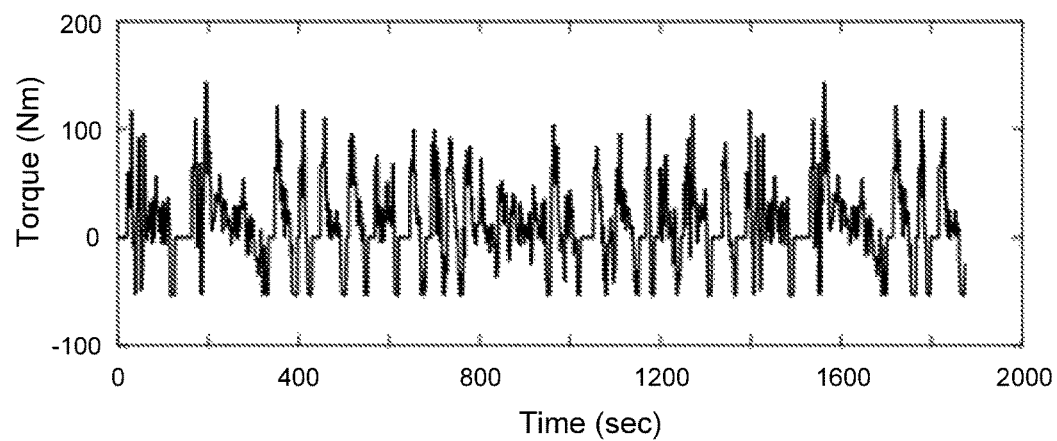
FIGS. 13A and 13B illustrate the torque split distribution between the permanent magnet motor (FIG. 13A) and the induction motor (FIG. 13B).
Figure 13B:
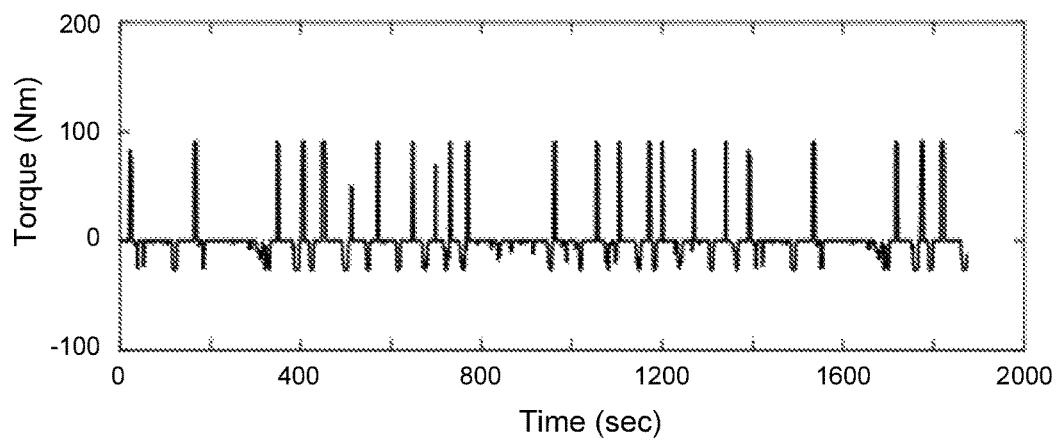

FIGS. 13A and 13B illustrate the torque split distribution between the permanent magnet motor (FIG. 13A) and the induction motor (FIG. 13B). Note that the permanent magnet motor supplies the torque required by the vehicle most of the time, although under high loads controller 123 is able to switch to the induction motor, or if high acceleration is needed, both motors may be used to simultaneously supply torque to the front and rear transmissions.

Based on the above case study, the inventors have found that a vehicle such as that shown in FIGS. 1-4 that utilizes both a permanent magnet synchronous motor (e.g., motor 103, motors 401/402) and an induction asynchronous motor (e.g., motor 109, motors 301/302) provides the operating efficiency of the permanent magnet motor under most low demand driving applications (e.g., stop and go city driving) while still delivering the high performance of the induction motor during strong acceleration and high speed cruising. Additionally, this combination of motors achieves a flatter power curve at high speed than is possible in a car using only induction motors.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A drive assembly for an electric vehicle (EV), comprising:
   at least one permanent magnet synchronous motor mechanically coupled to at least one wheel of a first vehicle axle, said at least one permanent magnet synchronous motor configured to provide propulsive power to said at least one wheel of said first axle of said EV, wherein a set of permanent magnet motor characteristics corresponding to said at least one permanent magnet synchronous motor is stored in a memory;
   a first motor controller coupled to said at least one permanent magnet synchronous motor;
   at least one induction asynchronous motor mechanically coupled to at least one wheel of a second vehicle axle, said at least one induction asynchronous motor configured to provide propulsive power to said at least one wheel of said second axle of said EV, wherein a set of induction motor characteristics corresponding to said at least one induction asynchronous motor is stored in said memory;
   a second motor controller coupled to said at least one induction asynchronous motor; and
   a vehicle controller electrically connected to said first motor controller and to said second motor controller, wherein said memory is accessible by said vehicle controller, wherein said vehicle controller is configured to receive a current torque request, wherein said vehicle controller is configured to determine and apply an optimal split between propulsive power supplied by said at least one permanent magnet synchronous motor to said at least one wheel of said first axle of said EV and propulsive power supplied by said at least one induction asynchronous motor to said at least one wheel of said second axle of said EV, wherein said optimal split is based on said current torque request, said set of permanent magnet motor characteristics and said set of induction motor characteristics, and wherein said vehicle controller is configured to continually update said optimal split based on said current torque request, said set of permanent magnet motor characteristics and said set of induction motor characteristics.

2. The drive assembly of claim 1, further comprising at least one wheel speed sensor, wherein said vehicle controller is configured to receive a current wheel speed from said at least one wheel speed sensor, and wherein said vehicle controller is configured to continually update said optimal split based on said current torque request, said current wheel speed, said set of permanent magnet motor characteristics and said set of induction motor characteristics.

3. The drive assembly of claim 1, further comprising a motor speed sensor coupled to said at least one permanent magnet synchronous motor, wherein said vehicle controller is configured to receive a current motor speed corresponding to said at least one permanent magnet synchronous motor from said motor speed sensor, and wherein said vehicle controller is configured to continually update said optimal split based on said current torque request, said current motor speed, said set of permanent magnet motor characteristics and said set of induction motor characteristics.

4. The drive assembly of claim 1, further comprising a motor speed sensor coupled to said at least one induction asynchronous motor, wherein said vehicle controller is configured to receive a current motor speed corresponding to said at least one induction asynchronous motor from said motor speed sensor, and wherein said vehicle controller is configured to continually update said optimal split based on said current torque request, said current motor speed, said set of permanent magnet motor characteristics and said set of induction motor characteristics.

5. The drive assembly of claim 1, further comprising:
a battery pack configured to supply electrical energy to said at least one permanent magnet synchronous motor and to said at least one induction asynchronous motor; and
an inverter, said inverter electrically interposed between said battery pack and said at least one permanent magnet synchronous motor and said inverter electrically interposed between said battery pack and said at least one induction asynchronous motor, wherein said inverter supplies said electrical energy from said battery pack to said at least one permanent magnet synchronous motor and supplies said electrical energy from said battery pack to said at least one induction asynchronous motor.

6. The drive assembly of claim 5, wherein said inverter is further comprised of a first inverter electrically interposed between said battery pack and said at least one permanent magnet synchronous motor and a second inverter electrically interposed between said battery pack and said at least one induction asynchronous motor.

7. The drive assembly of claim 6, wherein said battery pack is further comprised of a first battery pack electrically connected to said at least one permanent magnet synchronous motor via said first inverter and a second battery pack electrically connected to said at least one induction asynchronous motor via said second inverter.

8. The drive assembly of claim 1, further comprising:
a first differential, wherein said at least one permanent magnet synchronous motor is coupled to said at least one wheel of said first axle of said EV via said first differential; and
a second differential, wherein said at least one induction asynchronous motor is coupled to said at least one wheel of said second axle of said EV via said second differential.

9. The drive assembly of claim 8, said first differential comprising a first locking differential, and said second differential comprising a second locking differential.

10. The drive assembly of claim 1, further comprising an accelerator, wherein said current torque request is input by a user via said accelerator.

11. The drive assembly of claim 1, wherein said first axle of said EV corresponds to a front axle of said EV, and wherein said second axle of said EV corresponds to a rear axle of said EV.

12. The drive assembly of claim 1, wherein said vehicle controller and said first motor controller and said second motor controller are combined into a master controller.

13. The drive assembly of claim 1, said at least one permanent magnet synchronous motor comprising a single permanent magnet synchronous motor mechanically coupled to said at least one wheel of said first vehicle axle, and said at least one induction asynchronous motor comprising a single induction asynchronous motor mechanically coupled to said at least one wheel of said second vehicle axle.

14. The drive assembly of claim 1, said at least one permanent magnet synchronous motor comprising a single permanent magnet synchronous motor mechanically coupled to said at least one wheel of said first vehicle axle, and said at least one induction asynchronous motor comprising a first induction asynchronous motor mechanically coupled to said at least one wheel of said second vehicle axle and a second induction asynchronous motor mechanically coupled to said at least one wheel of said second vehicle axle.

15. The drive assembly of claim 1, said at least one permanent magnet synchronous motor comprising a first permanent magnet synchronous motor mechanically coupled to said at least one wheel of said first vehicle axle and a second permanent magnet synchronous motor mechanically coupled to said at least one wheel of said first vehicle axle, and said at least one induction asynchronous motor comprising a single induction asynchronous motor mechanically coupled to said at least one wheel of said second vehicle axle.

* * * * *